United States Patent [19]
Leibundgut et al.

[11] 4,029,956
[45] June 14, 1977

[54] LIGHT FIXTURE FOR PROJECTION DEVICE

[75] Inventors: Max Leibundgut, Wadenswil; Tony Reber, Zurich, both of Switzerland

[73] Assignee: Alos AG, Zurich, Switzerland

[22] Filed: Mar. 24, 1976

[21] Appl. No.: 670,021

[30] Foreign Application Priority Data

Mar. 24, 1975 Switzerland .............. 3714/75

[52] U.S. Cl. .................. 240/41.37; 240/44; 240/44.2
[51] Int. Cl.[2] ............................ F21V 7/09
[58] Field of Search ......... 240/41.37, 44, 44.2, 240/44.26, 41.3; 353/87; 355/67

[56] References Cited

UNITED STATES PATENTS

| 2,109,056 | 2/1938 | Bardwell et al. | 240/44 |
|---|---|---|---|
| 3,642,361 | 2/1972 | Streu | 240/44.2 |
| 3,707,327 | 12/1972 | Scheibel | 240/41.37 |

*Primary Examiner*—L. T. Hix
*Assistant Examiner*—J. A. LaBarre
*Attorney, Agent, or Firm*—Watson, Cole, Grindle & Watson

[57] ABSTRACT

In a projection device including a lamp unit detachably connected with a unit containing the optical condenser system, the lamp unit containing a concave mirror and an electric bulb mounted in a socket, the bulb being movable for the purpose of centering its filament coil in relation to the mirror and the condenser unit being fixedly mounted in a projection device while the lamp unit is merely supported by the condenser unit, the connecting means are so designed as to connect the lamp unit mechanically to the condenser unit as well as forming an electrical connection between the bulb socket and the terminal parts of the condenser unit. The connecting elements are secured to one of two units and extend parallel to the optical axis of the light fixture, the other of the units having guide recesses into which the connecting elements are inserted in the manner of a plug connection. Sliding elements are provided on the other unit that interact with the connecting elements, and the length of the connecting elements are such that the lamp unit can be adjusted as desired at various distances from the optical condenser system in order to make it possible to adjust the light fixture to various lens focal lengths of the projection device.

6 Claims, 7 Drawing Figures

LIGHT FIXTURE FOR PROJECTION DEVICE

BACKGROUND OF THE INVENTION

The present invention relates to a light fixture for projection devices, especially for microfilm viewing and enlarging machines.

A standard light fixture for projection devices includes an electric bulb serving as a light source, a socket for holding and providing an electrical connection of the light bulb, a concave mirror serving as a reflector, and an optical condenser system, whereby the bulb socket and the concave mirror are combined into a first constructional unit, hereinafter referred to as the "lamp unit," that is detachably connected with a second constructional unit containing the optical condenser system. The bulb is movable for the purpose of centering its filament coil in relation to the concave mirror, and the condenser unit is fixedly mounted in a projection device, while the lamp unit is merely supported by the condenser unit.

In such a light fixture, in order to achieve good light output, it is generally required that the bulb be movable in relation to the concave mirror and the condenser lens system, so that the filament coil of the lamp and a mirror image of the filament coil produced by the concave mirror can be moved into a predetermined position relative to one another, and so that they can be reproduced together by the condenser lens approximately on the axis of the light fixture at a point located inside the projection lens of a projection device in which the light fixture is being used. However, known embodiments of such light fixtures use relatively expensive means for setting up the socket for the light bulb, whereby in many cases, the concave mirror and the optical condenser system are mounted in such a manner that they are stationary and cannot be moved relative to one another. Furthermore, the proper adjustment of the bulb for centering its filament coil is difficult and complicated for non-experts to check. And, it is either entirely impossible or possible only in a relatively complicated manner to adjust the bulb in such known light fixtures to projection lenses with varying focal lengths. Thus in practice it often occurs that the light fixture is operated without optimal adjustment, and consequently the light output achieved is imperfect or entirely inadequate.

SUMMARY OF THE INVENTION

It is therefore an object of the invention to provide a light fixture of the aforedescribed type, wherein the optical centering of the lamp filament coil is facilitated and made easy to check, and adjustment of the bulb to projection lenses with various focal lengths is made possible in a hitherto unknown simple manner and can be performed quickly and easily even by non-experts without requiring any special aids.

This objective is carried out by the invention in a light fixture of the aforedescribed type chiefly in that only such connecting elements are used to connect the lamp unit mechanically to the condenser unit as simultaneously form an electrical connection between the bulb socket of the lamp unit and terminal parts in the condenser unit, that the connecting elements are attached to one of the two constructional units and extend parallel to the optical axis of the light fixture, and that the other constructional unit has guide recesses into which the connecting elements are inserted in the manner of a plug connection, and which have sliding contact elements that interact with the connecting elements. The length of the connecting elements are such that the lamp unit can be adjusted as described at various distances from the optical condenser system in the condenser unit, in order to make it possible to adjust the light fixture to various lens focal lengths of a projection device.

This construction facilitates the proper alignment of the light bulb by hand in the lamp unit separated from the condenser unit, and thus makes it easy to check the centering of the filament coil with the naked eye when the lamp is without current. In observing the lamp from the front, one can immediately see the filament coil of the lamp as well as the mirror image of the same produced by the concave mirror, whereby the relative position of the mirror image relative to the directly visible filament coil is surprisingly practically unrelated to the observer's angle of view. The optimal centering of the filament coil is thus attained when the mirror image produced by the concave mirror is seen in a predetermined position in relation to the actual filament coil, e.g. exactly above the real filament coil, regardless of whether one is looking exactly in the direction of the optical axis, or more or less obliquely thereto. When this optimal alignment of the light bulb in relation to the concave mirror is achieved, then the lamp unit is connected with the condenser unit, whereupon the light fixture is immediately ready for use, yielding the best possible light output. Because only such connecting elements are provided for the mechanical connection of the lamp unit and the condenser unit as simultaneously produce an electrical connection between the light bulb socket of the lamp unit and terminal parts of the condenser unit, the lamp unit can be completely removed from the stationary condenser unit without requiring separate disconnection of the electrical connection. Since, in addition, the connecting elements extend parallel to the optical axis of the light fixture over a length such that the lamp unit can be adjusted as desired at various distances from the optical condenser system of the condenser unit, it is simple and no trouble to adjust the light fixture to various lens focal lengths of a projection device by changing the distance between the condenser unit and the lamp unit depending upon the lens focal length, by simply pulling the lamp unit rearwardly or pushing it forwardly.

BRIEF DESCRIPTION OF THE DRAWINGS

Other features, advantages and details of the light fixture according to the invention will become more apparent from the following detailed description of the invention when taken in conjunction with the accompanying drawings wherein.

DETAILED DESCRIPTION OF THE INVENTION

Figure 1:
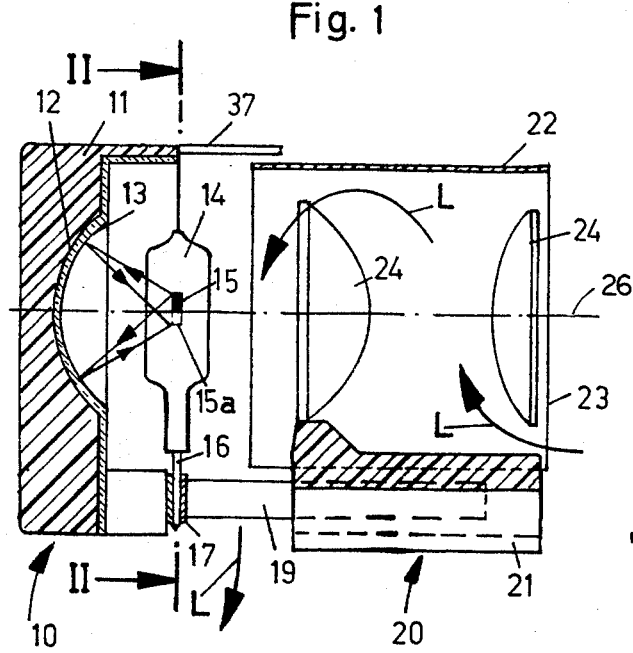
FIG. 1 is a vertical sectional view of a light device according to the invention for a projection device taken substantially along line I—I of FIG. 2.
Figure 2:
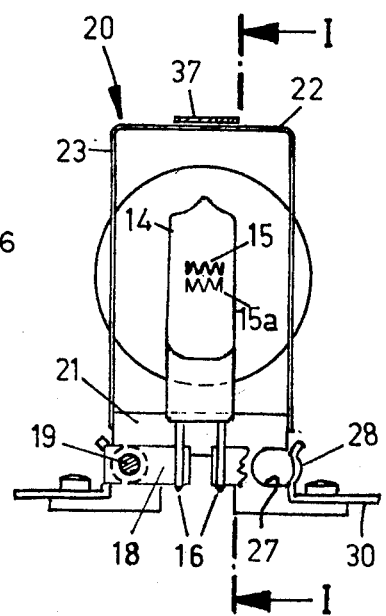
FIG. 2 is a cross-sectional view taken substantially along line II—II of FIG. 1.
Figure 3:
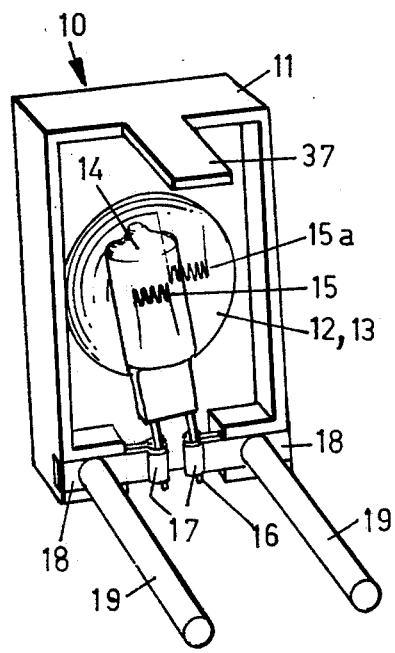
FIGS. 3 and 4 are perspective views of the lamp unit alone, separated from the condenser unit, respectively showing an uncentered and a centered position of the lamp filament coil.

Turning now to the drawings wherein like reference characters refer to like and corresponding parts throughout the several views, the constructional and mechanical design of the light fixture will be described with reference to FIGS. 1 through 5. The light fixture chiefly comprises two constructional units, namely a lamp unit 10 and a condenser unit 20. Lamp unit 10 has a housing 11 open at the end that faces condenser unit 20, and is of a heat-resistant plastic that can be metalized. The interior surfaces of housing 11 are covered with a specular coating 13 (FIG. 1). The rear interior wall of housing 11 has a spherical indentation 12 which, together with that part of specular coating 13 covering its surface, forms a concave mirror. Located in front of this concave mirror 12, 13 is a light bulb 14, which has a filament coil 15 and two plug and locking pins 16. Pins 16 are plugged into a lamp socket formed by two clips 17 each comprising two spring metal strips 18. Each of these clips 17 is fastened to electrically insulated housing 11 by means of a metal bolt 19. These bolts also serve as connecting elements for the mechanical connection of lamp unit 10 with condenser unit 20. At the same time, bolts 19 are also used for the electrical connection of lamp socket 17 and light bulb 14, as will be hereinafter described. Clips 17 are designed in such a manner that they permit a certain inclined adjustment of the light bulb 14 plug and locking pins 16, as shown in FIG. 3.

Condenser unit 20 has a base portion 21 and a U-shaped housing portion 22, which is fastened to base portion 21 by means of its U-feet 23. Base portion 21 and housing portion 22 together form a tunnel-like housing, in which an optical condenser system comprising two (or more) lenses 24 is mounted. Lenses 24 are fastened by means of their outermost edge sections, which fit into two matching slits 25 (FIG. 5) in U-feet 23 of housing portion 22. The optical axis 26 of optical condenser system 24 passes through the center of curvature or the focal point (not shown) of concave mirror 12, 13, and is thus also the optical axis of the entire light fixture. Provided on base portion 21 are guide grooves 27 for the insertion and guiding of bolts 19 attached to lamp unit 10. Bolts 19 and guide grooves 27 extend parallel to optical axis 26 of the light fixture, so that lamp unit 10 can be adjusted as desired at various distances from condenser system 14 by inserting bolts 19 more or less deeply into guide grooves 27; this will be described in greater detail hereinafter. Spring sliding contact elements 28 are fastened to base portion 21 of condenser unit 20 in the area of guide grooves 27, by means of screws 29 (FIG. 5) in such a manner that these contact elements 28 are connected to conduct electricity with bolts 19. Sliding contact elements 28 for bolts 19 are electrically insulated from one another and for such purpose, base portion 21 may be made of insulating plastic. Each of the sliding contact elements 28 has a connecting lug 30 or a similar element for connecting electrical conductors 31 for energizing light bulb 14 in lamp unit 10.

Scale markings 35 visible from the outside are provided on housing portion 22 of condenser unit 20. And, a reference point 36 is formed on housing 11 by the free end edge of a tongue 37 that projects from housing 11 parallel to optical axis 26. With the aid of scale markings 35 and reference point 36, it is possible to adjust lamp unit 10 easily and reproducibly at various predetermined distances from condenser system 24, thereby adapting it to various focal lengths or enlargement factors of the lens of a projection device in which the light fixture is to be used.

Housing 11 of lamp unit 10 and housing 21, 22 of condenser unit 20 together form a wind tunnel for a cool air current in such a manner that this current, coming, as indicated by arrows L in FIG. 1, from the front, i.e. from the side away from facing/lamp unit 10, flows first around front condenser lens 24 into the space between condenser lenses 24 and then through the spaces between the hindmost condenser lens 24 and lamp 14 and between lamp 14 and concave mirror 12, 13. In such manner an effect is achieved in that the cool air current, still in unheated condition, first and most effectively cools the support of the information to be projected that is immediately in front of foremost condenser lens 24, i.e. on the right in FIG. 1, then the lenses of condenser 14 and finally light bulb 14 and concave mirror 12, 13.

Figure 4:
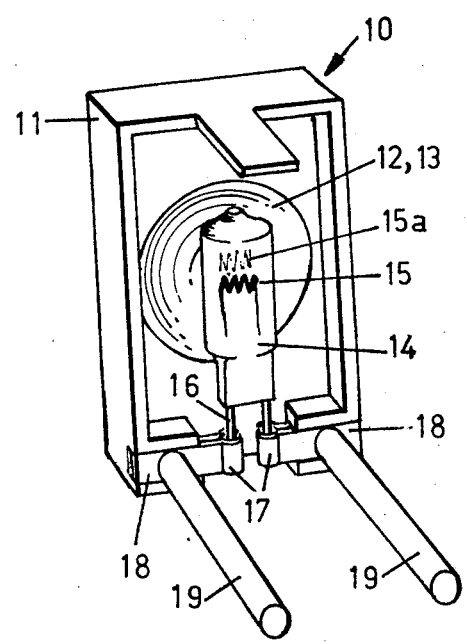

The principle of application and operation of the light fixture as above-described is as follows:

Base portion 21 of condenser unit 20 is fixedly mounted in a projection device (not shown), and connecting lugs 30 of sliding contact elements 28 are connected with a current source that can be turned on and off. Lamp unit 10 can be completely separated from condenser unit 20 simply by pulling bolts 19 out of guide grooves 27 of condenser unit base portion 21. Once this is done, light bulb 14 can, if necessary, be changed without any difficulty and/or filament coil 15 of the lamp can be centered in an optimal position relative to concave mirror 12, 13. If lamp unit 10 is viewed from its open front end, not only the filament coil 15 of lamp 14 is seen, but also mirror image 15a of the filament coil produced by concave reflector 12, 13, as shown in FIGS. 3 and 4. If filament coil 15 is located outside the line of the optical axis of lamp unit 10, then mirror image 15a also appears outside the optical axis, but on the opposite side of same, as can be seen in FIG. 3. To center filament coil 15, lamp 14 is moved relative to lamp socket 17 to such a position that mirror image 15a of filament coil 15 appears approximately at the location of the filament coil itself. Perfect centering would be achieved if mirror image 15a appeared behind filament coil 15 and was of the same size. Such a perfect centering, however, is neither necessary nor desired, because then filament coil 15 itself would prevent the light of mirror image 15a from reaching optical condenser system 24, and because the reflection falling on filament coil 15 results in an additional and generally damaging heating of the filament coil. For an optimal centering of filament coil 15, lamp 14 is therefore adjusted to such a position that mirror image 15a assumes a predetermined position in relation to the filament coil itself. To achieve optimal centering of a low voltage lamp with a relatively densely coiled filament coil, mirror image 15a is located just above or below filament coil 15 and is of approximately the same size as the filament coil itself. This is shown in FIG. 4.

To judge this optimal position of filament coil 15 and its mirror image 15a, it is not necessary to observe lamp unit 10 precisely in line with the direction of its optical axis. Deviations in the angle of view of up to 30° have no marked disturbing effect. Thus, it is possible even for unexperienced persons and non-technicians to center the filament coil optimally without any difficulty.

Subsequent to the centering procedure described above, lamp unit 10 is connected mechanically with condenser unit 20 by inserting bolts 19 into guide grooves 27 whereby, with the aid of sliding contact elements 28, the necessary electrical connection of light bulb 14 is automatically achieved at the same time.

Depending upon whether bolts 19 are pushed deeper or not so deeply into guide grooves 27, there is respectively a greater or lesser distance between lamp unit 10 and hindmost condenser lens 24 in condenser unit 20. This can be used for adjusting the light fixture to various focal lengths or enlargement factors of the lens of the projection device in which the light fixture is used. The effect of a change in the distance between lamp unit 10 and condenser unit 24 is diagrammed in FIGS. 6 and 7, which show the optically essential elements of lamp unit 10 and condenser unit 20, as well as a projection lens 41 or 42 and an information support 43 located between condenser unit 20 and lens 41 or 42, the information on which is to be projected onto a screen (not shown) by a transillumination process.

Figure 6:
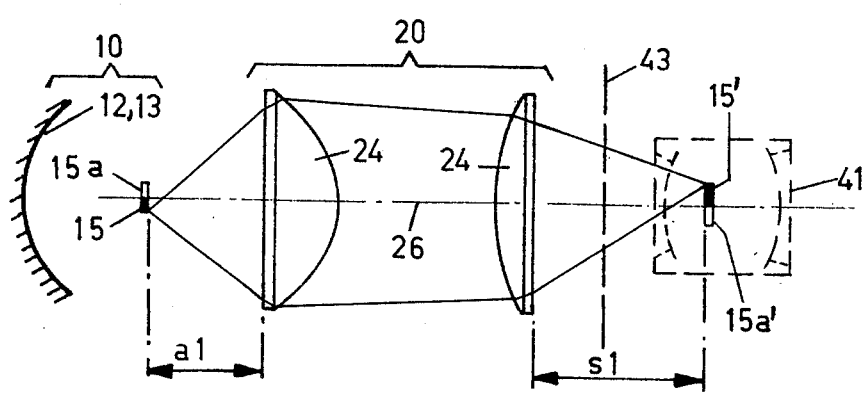
FIG. 6 illustrates a diagram of the correct alignment of the lamp unit in relation to the optical condenser system for use of the light fixture in a projection device having a short focal length lens, which therefore has a larger enlargement factor.

According to FIG. 6, projection lens 41 has a relatively short focal length, whereupon lens 41 is located at an appropriately short distance from information support 43 to be projected. It is known that for an optimal light output, and to achieve even illumination of the screen, it is necessary that optical condenser system 24 produce optical images 15' and 15a' of filament coil 15 and its mirror image 15a' inside, or more precisely, in the entry pupil of projection lens 41; in other words, at a point that lies at a relatively short distance $s1$ in front of optical condenser system 24 in the case of a short focal length lens. In order to achieve this, a distance $a1$ between filament coil 15 and optical condenser system 14 must be adjusted to be relatively great, by pushing bolts 19 attached to lamp unit 10 only a short distance into guide grooves 27. Thereby, the geometric dimensions of images 15' and 15a' of the filament coil and its mirror image become relatively small, which has an advantageous effect on the light output, because in the ideal case, images 15' and 15a' should both fit completely inside the entry pupil of projection lens 41. In the event images 15' and 15a' together are larger than the entry pupil of lens 41, then the parts of images 15 and 15a' lying outside the circumference of the entry pupil of lens 41 can not add illumination to the screen.

Figure 7:
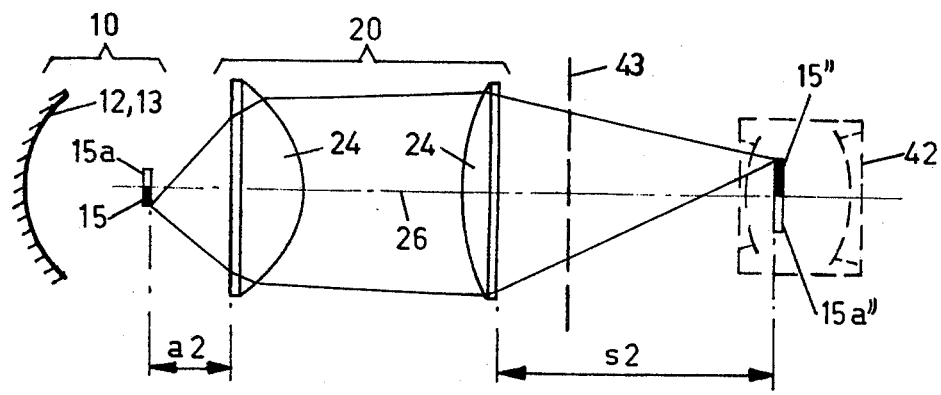
FIG. 7 is an illustration similar to FIG. 6 in the event that the light fixture is used in a projection device having a long focal length lens, which therefore has a smaller enlargement factor.

If, in accordance with FIG. 7, projection lens 42 has a longer focal length, then the lens is at a correspondingly great distance in front of information support 43. In order to achieve the effect for such an arrangement wherein images 15" and 15a" of filament coil 15 and its mirror image 15a produced by optical condenser system 24 both fit inside the entry pupil of projection lens 42, or at a point at a greter distance $s2$ in front of optical condenser system 24, it is necessary to maintain a lesser distance $a2$ between filament coil 15 and optical condenser system 14. Lamp unit 10 is therefore pushed closer to optical condenser system 24. In this manner, the geometric dimensions of images 15 and 15a become larger than in the previous arrangement illustrated in FIG. 6 which, however, is not a disadvantage, since in the longer focal length lens 42 the entry pupil also is larger, insofar as the relative opening width or F number of separate lenses 41 and 42 is the same.

Figure 5:
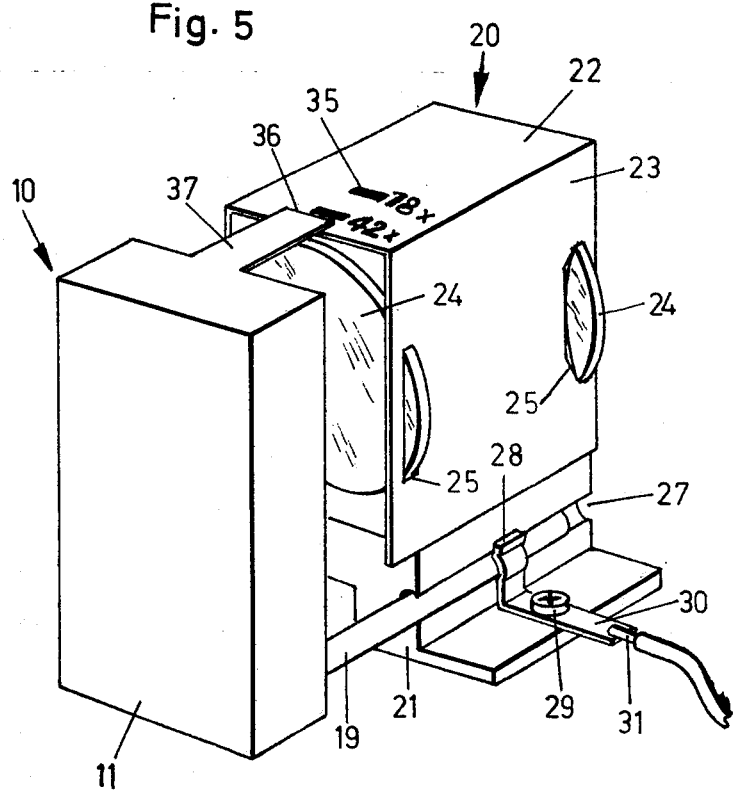
FIG. 5 is a perspective view of the entire light fixture, wherein a scale and a reference point for indicating the preferable distance between the lamp unit and the optical condenser system of the condenser unit for various focal lengths or enlargement factors of projection lens are illustrated.

The preferred adjustment of the distance between lamp unit 10 and optical condenser system 24 for each arrangement can easily be found by referring to scale markings 35 and reference point 36 (FIG. 5).

In summary, the advantages of the projection device light fixture described in the above are as follows: possibility of separating lamp unit 10 from condenser unit 20 permits easy changing of light bulb 14, and simple and untroublesome optimal centering of the filament coil 15 relative to concave mirror 12, 13. This can be done without using any aids and with no difficulty even by non-technicians, whereby a special advantage lies in the fact that when lamp unit 10 is separated from condenser unit 20, the electrical current conductors to lamp socket 17 are automatically disconnected. By simply changing distance $a1$, $a2$ between lamp unit 10 and optical condensor system 24, it is possible to adjust the lighting fixture easily to various projection lenses 41 and 42 having different focal lengths and/or different-sized entry pupils, so that in each case an optimal light output can be achieved. The favorable adjustment for each case can be easily determined by means of scale markings 35 and reference point 36. The direction of the cool air current indicated by arrows L in FIG. 1 assures that the still cold air first cools the most heat-sensitive information support 43 (FIGS. 6 and 7), then condenser lenses 24 and finally light bulb 14 and concave mirror 12, 13. The fact that concave reflector 12, 13 is disposed directly in the rear interior wall of housing 11 of lamp unit 10 and that lamp socket 17 is attached directly to the same housing 11, which is made of insulating material, makes it possible to construct the unit economically and inexpensively.

It is of course possible, for various constructions not otherwise illustrated, to attach bolts 19, which serve as connecting elements between lamp unit 10 and condenser unit 20, to the condenser unit instead of to the lamp unit, in which case it is preferable that electrical leads 31 be directly connected with bolts 19 and sliding contact elements 27 be attached to the lamp unit. Instead of bolts, it is of course possible to use other rod or pipe-like connecting elements, such as bar sections. And, scale markings 35 can, if so desired, be on the lamp unit and the associated reference point 36 on the condenser unit.

The light fixture according to the invention is suitable for use with various types of projection devices, but especially microfilm viewing and enlarging machines, in which it is highly important to obtain a good and even illumination of the screen.

Obviously, many other modifications and variations of the invention are made possible in the light of the above teachings. It is therefore to be understood that within the scope of the appended claims the invention may be practiced otherwise than as specifically described.

What is claimed is:

1. A light fixture for projection devices, including an electric light bulb serving as a light source, a bulb socket for holding and providing an electrical connection of the light bulb, a concave mirror serving as a reflector, and an optical condenser system including a condenser unit having an electric terminal, whereby the bulb socket and the concave mirror are combined into a first constructional unit, hereinafter referred to as a lamp unit, that is detachably connected with a second constructional unit containing the optical condenser system, and whereby the bulb is movable for the purpose of centering its filament coil in relation to the concave mirror, and the condenser unit is designed for stationary mounting in a projection device, while the lamp unit is only supported by the condenser unit, characterized in that connecting elements are provided to effect a mechanical connection of the lamp unit to the condenser unit as well as to effect an electrical connection between the bulb socket of the lamp unit and the terminal in the condenser unit, the connecting elements being secured to one of the two constructional units and extending parallel to the optical axis of the light fixture, the other of the constructional units having guide grooves with which the connecting elements engage, and sliding contact elements on the other of the constructional units in contact with the connecting elements, whereby the connection elements are sufficiently long that the lamp unit can be adjusted as desired at various distances from the optical condenser system in the condenser unit, thereby making it possible to adjust the light fixture to various lens focal lengths of the projection device.

2. The light fixture according to claim 1, wherein a first of the two construction units has scale markings provided thereon and a second of the two constructions units has a reference point thereon to indicate the distance of the lamp unit from the condenser unit for various lens focal lengths or enlargement factors of the projection device.

3. The light fixture according to claim 1, wherein two plug and locking pins are provided on the light bulb, and the bulb socket is fixedly mounted in the lamp unit and is provided with two contact clips that hold the plug and locking pins of the light bulb, to thereby facilitate adjustment of the angle position and axial direction of the plug and locking pins.

4. The light fixture according to claim 1, wherein the lamp unit includes a housing open on the side facing the condenser unit, the housing having metallized interior surfaces, whereby the concave reflector is formed by a portion of the metallized rear interior wall of the housing.

5. The light fixture according to claim 4, wherein the housing is of a heat-resistant plastic that can be metallized.

6. The light fixture according to claim 4, wherein the condenser unit includes a housing which, together with the housing of the lamp unit form a continuous wind tunnel for a cool air current from a front end of the optical condenser system, or from an end facing away from the lamp unit, to an inter-lens space in the optical condenser system, and from there to the light bulb and the concave mirror.

* * * * *